United States Patent
Kim et al.

(10) Patent No.: US 12,456,903 B2
(45) Date of Patent: Oct. 28, 2025

(54) MOBIL RENEWABLE POWER PLANT FOR MILITARY AND THE OTHER INDUSTRIES

(71) Applicant: K-TECHNOLOGY USA, INC., Los Angeles, CA (US)

(72) Inventors: Ki Il Kim, Los Angeles, CA (US); Young Kim, Los Angeles, CA (US); Sarah Duncanson, Los Angeles, CA (US); Paul Kim, Beverly Hills, CA (US)

(73) Assignee: K-TECHNOLOGY USA, INC.

( * ) Notice: Subject to any disclaimer, the term of this patent is extended or adjusted under 35 U.S.C. 154(b) by 151 days.

(21) Appl. No.: 18/424,894

(22) Filed: Jan. 29, 2024

(65) Prior Publication Data
US 2025/0246971 A1 Jul. 31, 2025

(51) Int. Cl.
*H02K 7/18* (2006.01)
*H02K 7/02* (2006.01)

(52) U.S. Cl.
CPC ............. *H02K 7/1861* (2013.01); *H02K 7/02* (2013.01)

(58) Field of Classification Search
CPC .............................. H02K 7/1861; H02K 7/02
USPC .......................................................... 60/668
See application file for complete search history.

(56) References Cited

U.S. PATENT DOCUMENTS

| | | | | |
|---|---|---|---|---|
| 575,969 A * | 1/1897 | McCallum | ............... | B60K 6/12 60/668 |
| 642,869 A * | 2/1900 | Motsinger | .............. | H02K 11/23 310/70 R |
| 757,436 A * | 4/1904 | Bole | ......................... | H02J 3/38 322/4 |
| 865,812 A * | 9/1907 | Powell | .................... | B60L 50/30 318/293 |
| 865,816 A * | 9/1907 | Powell | .................... | B60L 50/30 318/150 |
| 925,385 A * | 6/1909 | Riecke | ....................... | H02P 7/34 318/141 |
| 1,047,329 A * | 12/1912 | Sundh | ..................... | F16H 47/04 60/434 |
| 1,055,569 A * | 3/1913 | Sundh | ....................... | B60T 7/20 290/3 |
| 1,064,089 A * | 6/1913 | Rayner | ..................... | H02P 9/00 180/65.245 |
| 1,121,381 A * | 12/1914 | Leonard | ................. | B60K 6/365 180/65.245 |
| 1,131,402 A * | 3/1915 | Manson | ................... | F02N 11/04 290/37 R |
| 1,134,771 A * | 4/1915 | Sundh | .................... | F16D 63/002 200/61.54 |
| 1,184,604 A * | 5/1916 | Adams | ...................... | B60B 9/06 152/109 |
| 1,276,045 A * | 8/1918 | Entz | ......................... | B60K 6/24 310/108 |
| 1,525,129 A * | 2/1952 | Heany | ................. | B60R 16/0235 290/37 R |
| 2,712,109 A * | 6/1955 | Graziose | ............. | H02K 7/1861 290/1 R |
| 3,108,838 A * | 10/1963 | McCleary | ............... | B60B 33/06 29/520 |

(Continued)

*Primary Examiner* — Tulsidas C Patel
*Assistant Examiner* — Thomas K Quigley
(74) *Attorney, Agent, or Firm* — NKL Law; Jae Youn Kim

(57) ABSTRACT

Provided is a system for generating power using vehicles such as commercial cars. The system uses a commercial vehicle to rotate power generators so as to generate electric power.

1 Claim, 4 Drawing Sheets

(56) References Cited

U.S. PATENT DOCUMENTS

| | | | | |
|---|---|---|---|---|
| 3,367,438 A * | 2/1968 | Pelton | ............... | B60L 50/61 |
| | | | | 180/65.23 |
| 3,514,681 A * | 5/1970 | Walter | ............... | B60L 58/40 |
| | | | | 180/65.8 |
| 3,859,589 A * | 1/1975 | Rush | ............... | H02K 7/1861 |
| | | | | 307/64 |
| 3,861,487 A * | 1/1975 | Gill | ............... | B60K 25/10 |
| | | | | 180/2.2 |
| 3,921,741 A * | 11/1975 | Garfinkle | ............... | B62M 6/45 |
| | | | | 180/206.6 |
| 3,972,380 A * | 8/1976 | Hudson | ............... | B60L 53/14 |
| | | | | 180/65.25 |
| 4,019,396 A * | 4/1977 | Frechette | ............... | F16H 33/02 |
| | | | | 74/64 |
| 4,239,975 A * | 12/1980 | Chiappetti | ............... | F03G 7/08 |
| | | | | 290/1 R |
| 4,247,785 A * | 1/1981 | Apgar | ............... | H02K 49/10 |
| | | | | 290/1 R |
| 4,351,405 A * | 9/1982 | Fields | ............... | B60K 6/52 |
| | | | | 290/19 |
| 6,387,007 B1 * | 5/2002 | Fini, Jr. | ............... | B60K 6/387 |
| | | | | 903/910 |
| 6,467,519 B1 * | 10/2002 | Owen | ............... | B60C 7/24 |
| | | | | 301/64.704 |
| 6,717,280 B1 * | 4/2004 | Bienville | ............... | B62M 6/90 |
| | | | | 290/1 R |
| 7,279,799 B1 * | 10/2007 | McCauley | ............... | H02K 7/1861 |
| | | | | 290/1 R |
| 7,501,713 B2 * | 3/2009 | Fein | ............... | F03D 9/25 |
| | | | | 290/55 |
| 7,591,749 B2 * | 9/2009 | Diemer | ............... | F16H 3/728 |
| | | | | 475/5 |
| 8,174,231 B2 * | 5/2012 | Sandberg | ............... | H02J 7/0013 |
| | | | | 290/1 R |
| 8,334,603 B2 * | 12/2012 | Daya | ............... | B61C 3/00 |
| | | | | 290/1 R |
| 8,723,344 B1 * | 5/2014 | Dierickx | ............... | F03G 7/08 |
| | | | | 290/1 R |
| 8,872,368 B1 * | 10/2014 | Kim | ............... | B61D 43/00 |
| | | | | 290/3 |
| 9,006,916 B2 * | 4/2015 | Chiu | ............... | F03G 7/08 |
| | | | | 290/1 R |
| 11,615,923 B2 * | 3/2023 | Macaluso | ............... | B60L 53/24 |
| | | | | 290/1 R |
| 2005/0242589 A1 * | 11/2005 | Zinck | ............... | F03B 1/00 |
| | | | | 290/43 |
| 2008/0070733 A1 * | 3/2008 | Diemer | ............... | B60K 6/365 |
| | | | | 475/5 |
| 2008/0150297 A1 * | 6/2008 | Shadwell | ............... | H02K 7/1853 |
| | | | | 310/20 |
| 2010/0270810 A1 * | 10/2010 | Liebermann | ............... | B60L 55/00 |
| | | | | 123/3 |
| 2011/0061957 A1 * | 3/2011 | Hargett | ............... | B60K 6/46 |
| | | | | 180/65.245 |
| 2011/0068582 A1 * | 3/2011 | Dugas | ............... | F03D 9/25 |
| | | | | 290/55 |
| 2012/0169061 A1 * | 7/2012 | Lee | ............... | F03D 15/10 |
| | | | | 290/55 |
| 2016/0006319 A1 * | 1/2016 | Fimbres | ............... | F03G 7/08 |
| | | | | 290/1 R |
| 2016/0152252 A1 * | 6/2016 | Kim | ............... | B61L 15/0081 |
| | | | | 701/31.4 |
| 2016/0355092 A1 * | 12/2016 | Higuchi | ............... | B62D 21/02 |
| 2017/0050517 A1 * | 2/2017 | Higuchi | ............... | B60K 17/342 |
| 2021/0384800 A1 * | 12/2021 | Macaluso | ............... | B60K 1/04 |

* cited by examiner

MOBIL RENEWABLE POWER PLANT FOR MILITARY AND THE OTHER INDUSTRIES

BACKGROUND

One or more embodiments of the present invention relate to an apparatus or system for generating power using vehicles such as commercial and military cars. The system uses commercially electric or gasoline vehicles to rotate power generators so as to generate electric power.

SUMMARY

An aspect of the present invention provides a system that uses a commercialized vehicle to drive at least one power generator, thereby generating power.

In an embodiment of the present invention, the vehicle has a left and right wheel, each of which including a sprocket configured to be fixed to an axle shaft of the vehicle after a wheel and tire assembly of the vehicle is uninstalled from the axle shaft.

In another embodiment of the present invention, the sprocket and the axle shaft are connected through a shaft connector.

In another embodiment of the present invention, the at least one power generator comprises a first power generator connected to the left sprocket through a first chain, and a second power generator connected to the first power generator connected to the through a second chain.

In another embodiment of the present invention, the at least one power generator further comprises a third power generator and a fourth power generator, both of which being driven by an electric motor powered by electricity generated from at least one of the first and second power generators.

In another embodiment of the present invention, the electric motor is located between the third and fourth power generators and is connected to the third and fourth power generators through a third and fourth chains, respectively.

In another embodiment of the present invention, power generated from the first power generator is supplied to a charger configured for charging the electric vehicle.

In another embodiment of the present invention, power generated from the third and fourth power generators is supplied to a grid.

In another embodiment of the present invention, the at least one power generator comprises a fifth power generator connected to the right sprocket and a sixth power generator connected to the fifth power generator.

In another embodiment of the present invention, the fifth power generator is connected to the right sprocket through a fifth chain, and the fifth power generator is connected to the sixth power generator through a sixth chain.

In another embodiment of the present invention, power generated from the fifth and sixth power generators is supplied to at least one of a grid and a charger for charging the electric vehicle.

In another embodiment of the present invention, a power generating system may comprise: a vehicle having at least one axle shaft; at least one power generator, wherein the at least one power generator comprises a front extended shaft and a rear extended shaft, and the front extended shaft of the at least one power generator is engaged with the at least one axle shaft; and at least one smart wheel turbine engaged with the rear extended shaft of the at least one power generator.

In another embodiment of the present invention, the system may further comprise at least one couple ring configured to couple the at least one axle shaft of the vehicle and the front extended shaft of the at least one power generator.

In another embodiment of the present invention, the at least one axle shaft may comprise a first axle shaft and a second axle shaft, and the at least one couple ring may comprise a first couple ring and a second couple ring.

In another embodiment of the present invention, the at least one power generator may comprise a first power generator connected to the first axle shaft through the first couple ring, and a second power generator connected to the second axle shaft through the second couple ring.

In another embodiment of the present invention, the at least one smart wheel turbine may comprise a first smart wheel turbine connected to the first power generator and a second smart wheel turbine connected to the second power generator.

In another embodiment of the present invention, the at least one axle shaft may further comprise a third axle shaft and a fourth axle shaft, and the at least one couple ring further comprises a third couple ring and a fourth couple ring.

In another embodiment of the present invention, the at least one power generator may further comprise a third power generator connected to the third axle shaft through the third couple ring, and a fourth power generator connected to the fourth axle shaft through the fourth couple ring.

In another embodiment of the present invention, the at least one smart wheel turbine may further comprise a third smart wheel turbine connected to the third power generator and a fourth smart wheel turbine connected to the fourth power generator.

In another embodiment of the present invention, the system may further comprise a weight support fixture which supports the vehicle, wherein the weight support fixture comprises at least two steel beams.

BRIEF DESCRIPTION OF THE DRAWINGS

These and other aspects will become apparent and more readily appreciated from the following description of the embodiments, taken in conjunction with the accompanying drawings of which.

The features and advantages of the present invention will become more apparent from the detailed description set forth below when taken in conjunction with the drawings in which like reference numbers indicate identical or functionally similar elements.

DETAILED DESCRIPTION

Figure 1:
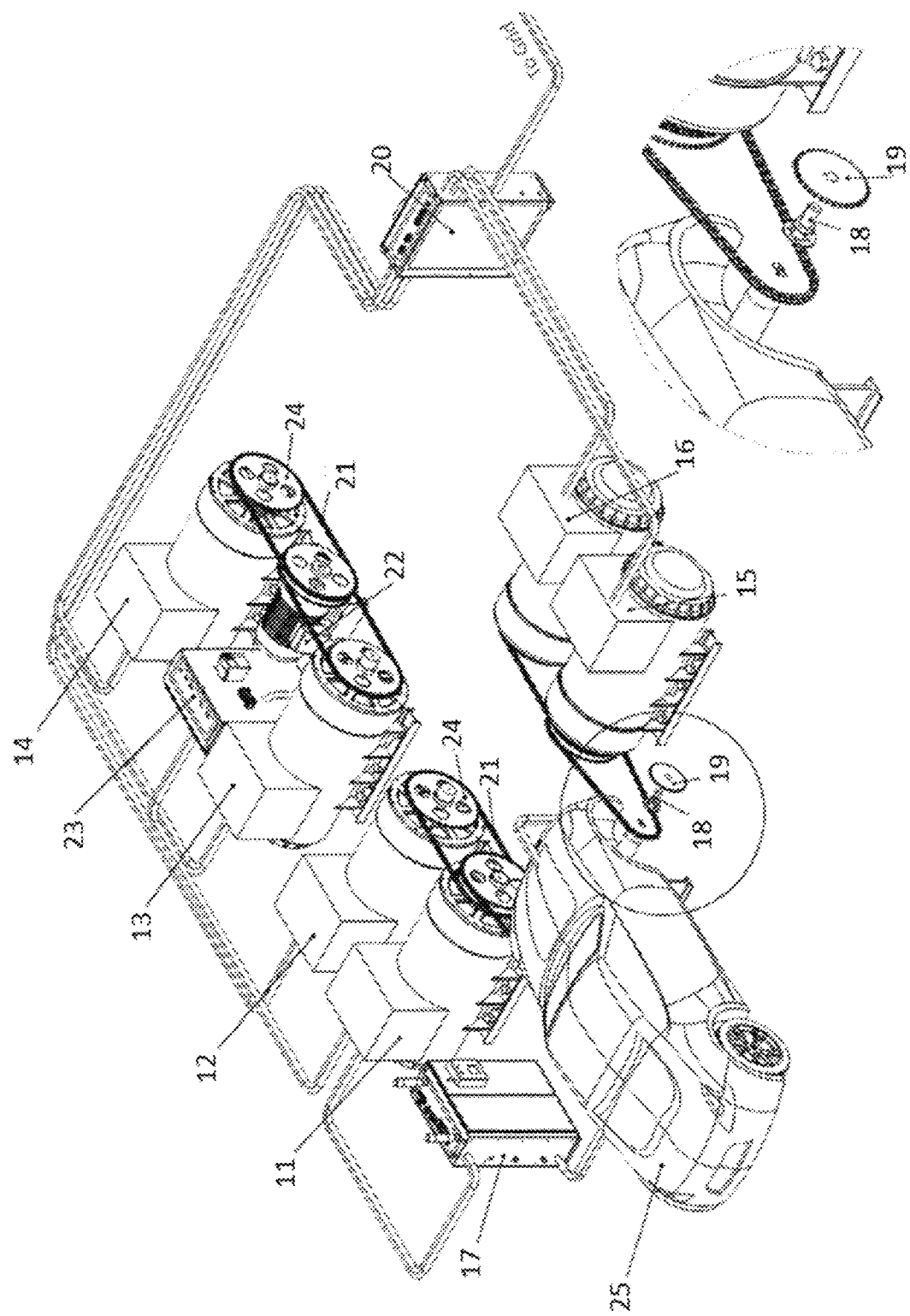
FIG. 1 is a perspective view of a power generating system using a commercialized vehicle of an exemplary embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first", "second, and the like may be used to describe various elements, but do not limit the elements. Such terms are only used to classify one element from another.

These and/or other aspects will become apparent and more readily appreciated from the following description of embodiments of the present invention, taken in conjunction with the accompanying drawing.

Figure 2:
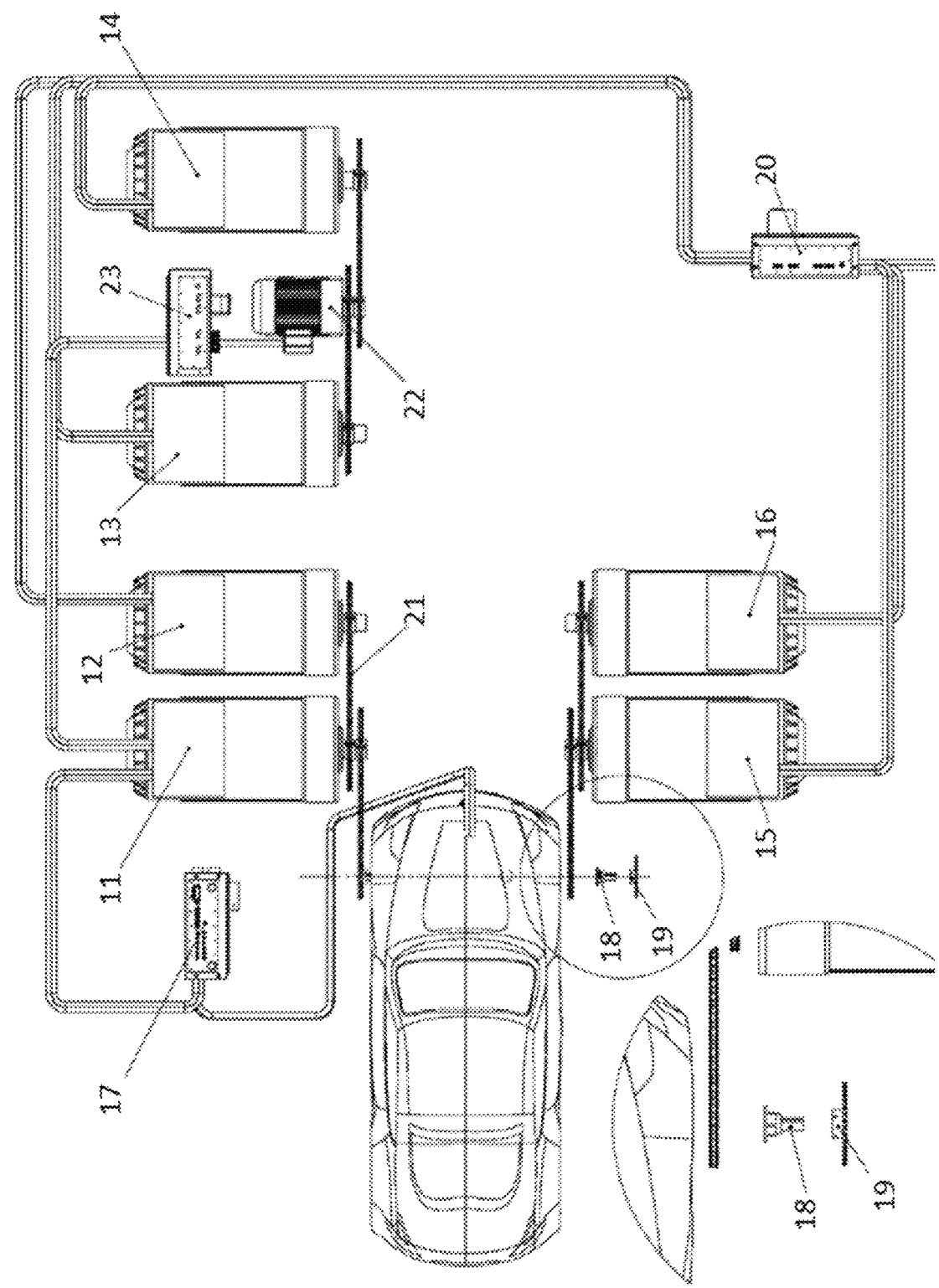
FIG. 2 is a plan view of the power generating system of an exemplary embodiment.

An aspect of the present invention provides a system that uses a commercialized vehicle to drive at least one power generator, thereby generating power. Referring to FIGS. 1 and 2, a commercialized vehicle 25 can be used to generate electric power in the present system. The commercialized vehicle 25 may include compact cars, trucks, and buses, but not limited thereto. For example, an electric compact car 25 may be used for generating electric power in the system. If the electric car 25 is front wheel driven, the front wheel and tires may be uninstalled from the car 25, and the front part of the car 25 may be lifted up so that the front axle can be used to rotate power generators as shown in FIG. 1.

In an embodiment of the present invention, the electric vehicle 25 has a left and right wheels, each of which including a sprocket 19 configured to be fixed to an axle shaft of the vehicle 25 after a wheel and tire assembly of the vehicle 25 is uninstalled from the axle shaft.

In another embodiment of the present invention, the sprocket 19 and the axle shaft are connected through a shaft connector 18. After the wheel and tire assembly is uninstalled, the shaft connector 18 can be fixed to the axle shaft, and then the sprocket 19 can be connected to the shaft connector 18. Any kind of known fasteners including a bolt and nut assembly can be used to fix the shaft connector 18 to the axle shaft, and to fix the sprocket 19 to the shaft connector 18.

In another embodiment of the present invention, the system may have a first power generator 11 connected to the left sprocket 19 through a first chain 21, and a second power generator 12 connected to the first power generator 11 through another chain 21 and sprocket 24. Alternatively, a belt may be used in lieu of the chain 21 to connect the sprocket 19 with the first power generator 11.

In another embodiment of the present invention, the system may further have a third power generator 13 and a fourth power generator 14, both of which being driven by an electric motor 22 powered by electricity generated from at least one of the first and second power generators 11 and 12. The electric motor 22 may be connected to at least one of the first and second power generators 11 and 12 via a charger 23.

In another embodiment of the present invention, the electric motor 22 is located between the third and fourth power generators 13 and 14, and is connected to the third and fourth power generators 13 and 14 through a third and fourth chains 21, respectively.

In another embodiment of the present invention, power generated from the first power generator 11 is supplied to a charger 17 configured for charging the electric vehicle 25.

In another embodiment of the present invention, power generated from the third and fourth power generators 13 and 14 can be supplied to an electric multimeter 20 connected to a grid.

In another embodiment of the present invention, the system may further have a fifth power generator 15 connected to the right sprocket 19 and a sixth power generator 16 connected to the fifth power generator 15. The fifth power generator 15 can be connected to the right sprocket 19 through another chain 21, and the fifth power generator 15 can be connected to the sixth power generator through another chain 21. Each of the power generators 11-16 and the electric motor 22 can have a sprocket 21 configured to engage with the chain 21.

In another embodiment of the present invention, power generated from the fifth and sixth power generators 15 and 16 can be supplied to the multimeter 20 or can be supplied to the charger 17 for charging the electric vehicle 25. In other words, the power generated from the power generators 11-16 driven by the electric car 25 can be supplied to the grid or to the electric charger 17 for charging the electric car 25. For example, the power generated from the first power generator 11 can be supplied to the charger 17 and to the electric motor 22, and the power generated from the second to sixth generators 12-16 can be supplied to the grid.

Figure 3:
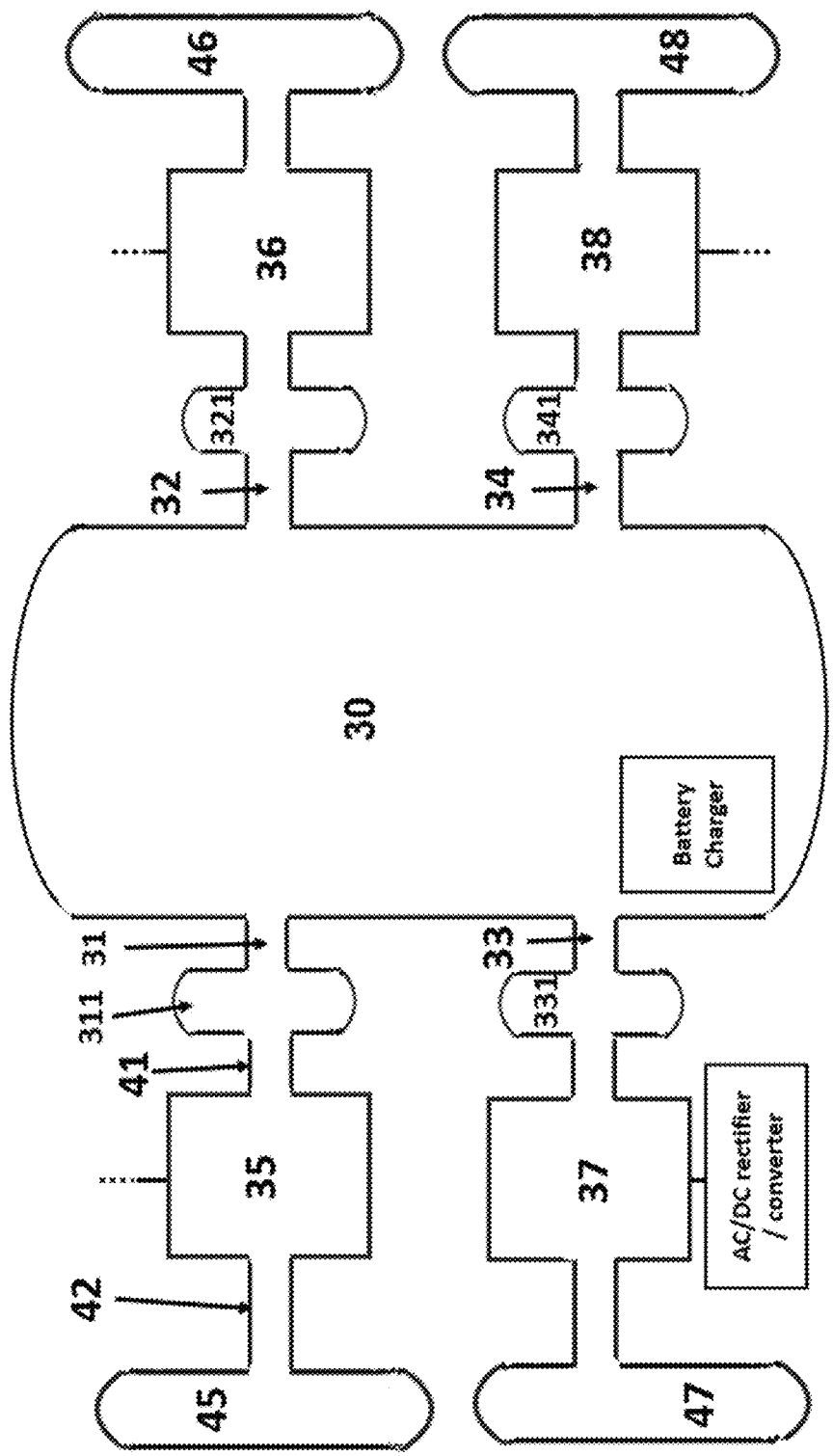
FIG. 3 is a plan view of the power generating system of another exemplary embodiment.

Referring now to FIG. 3, in another embodiment of the present invention, a power generating system may include a vehicle 30 with at least one axle shaft 31 and at least one power generator 35. The at least one power generator 35 may include a front extended shaft 41 and a rear extended shaft 42, and the front extended shaft 41 of the at least one power generator 35 is engaged with the at least one axle shaft 31. The system may further include at least one smart wheel turbine 45 engaged with the rear extended shaft 42 of the at least one power generator 35. The at least one smart wheel turbine 45 may include a flywheel, but not limited thereto. In an exemplary embodiment, the at least one power generator 35 may be a permanent magnet generator, but not limited there to. According to an exemplary embodiment, the system may further comprise at least one couple ring 311. The couple ring 311 is configured to couple the at least one axle shaft 31 of the vehicle 30 and the front extended shaft 41 of the at least one power generator 35. The at least one couple ring may be substituted with at least one joint, but not limited thereto.

Referring still to FIG. 3, in an exemplary embodiment, the at least one axle shaft may comprise a first axle shaft 31 and a second axle shaft 32, and the at least one couple ring may comprise a first couple ring 311 and a second couple ring 321. Also, the at least one power generator may comprise a first power generator 35 connected to the first axle shaft 31 through the first couple ring 311, and a second power generator 36 connected to the second axle shaft 32 through the second couple ring 321. According to an exemplary embodiment, the at least one smart wheel turbine may comprise a first smart wheel turbine 45 connected to the first power generator 35 and a second smart wheel turbine 46 connected to the second power generator 36.

Referring still to FIG. 3, also, in an exemplary embodiment, the at least one axle shaft may further comprise a third axle shaft 33 and a fourth axle shaft 34, and the at least one couple ring may further comprise a third couple ring 331 and a fourth couple ring 341. The at least one power generator may further comprise a third power generator 37 connected to the third axle shaft 33 through the third couple ring 331, and a fourth power generator 38 connected to the fourth axle shaft 34 through the fourth couple ring 341. The at least one smart wheel turbine may further comprise a third smart wheel turbine 47 connected to the third power generator 37 and a fourth smart wheel turbine 48 connected to the fourth power generator 38.

Figure 4:
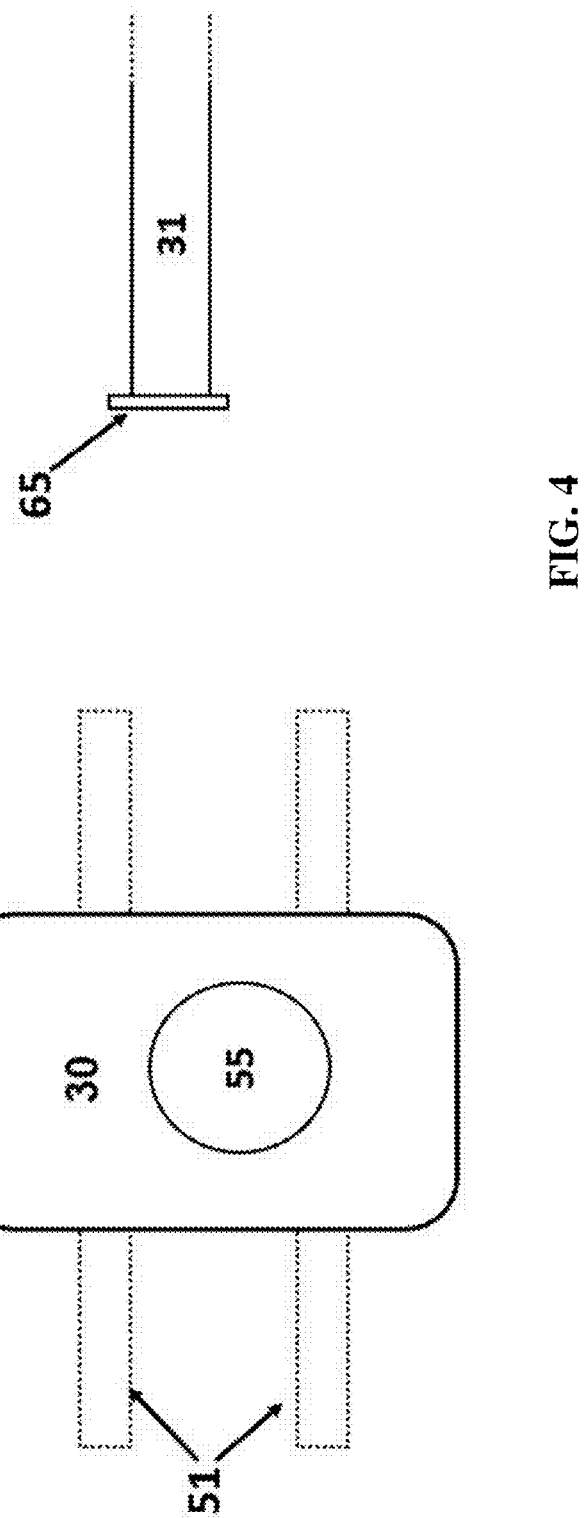
FIG. 4 is supplemental plan view of the power generating system of another exemplary embodiment.

Referring now to FIG. 4, the system may further comprise a weight support fixture 51 which supports the vehicle 30. The weight support fixture 51 may comprise at least two steel H-beams, but not limited thereto. Also, in an exemplary embodiment, the vehicle 30 may further include a drone 55. The axle shaft may include a axle's rim 65.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A power generating system, comprising:
    a vehicle having at least one axle shaft and fixed on weight supporting beams; and
    at least one power generator having at least one shaft and connected to the at least one axle shaft of the vehicle,
    wherein the least one shaft of the at least one power generator is extended from the at least one axle shaft of the vehicle, and
    wherein the at least one power generator is mounted on a ground and produces electric power when the at least one axle shaft of the vehicle is rotated.

* * * * *